W. O. DAVIES.
Car-Door.
No. 8,548. Reissued Jan. 21, 1879.
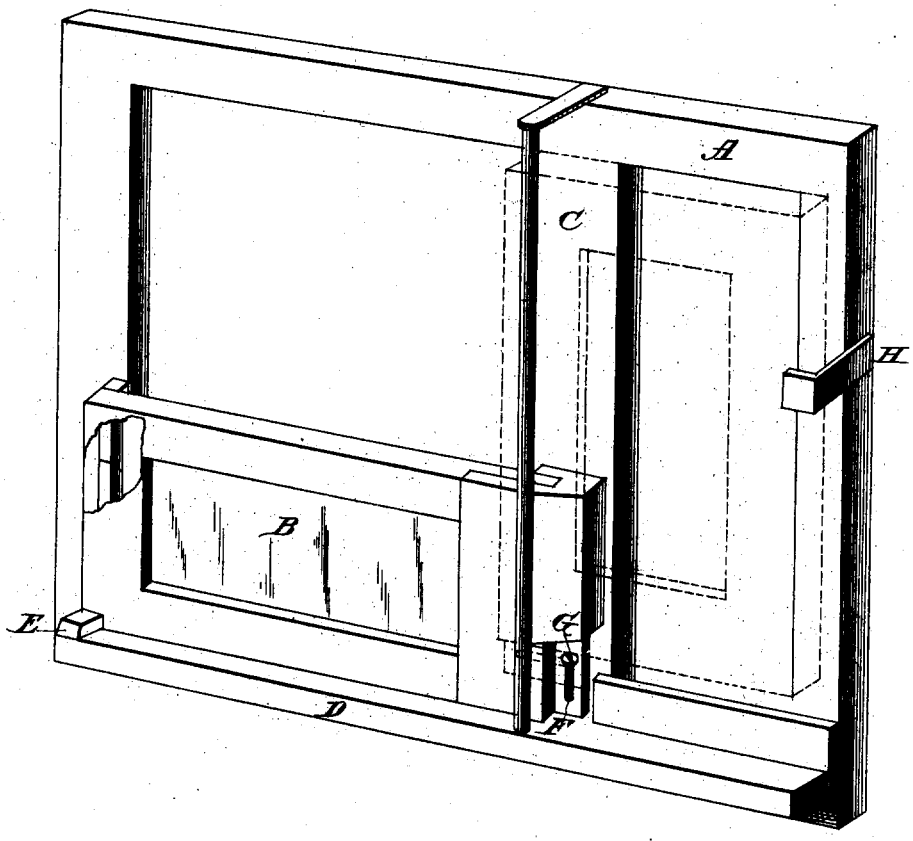
Witnesses:
E. J. Smith
A. Abrams
Inventor:
William O Davies
By J B Smith
Atty.
N. PETERS, PHOTO-LITHOGRAPHER, WASHINGTON, D. C.

UNITED STATES PATENT OFFICE.

WILLIAM O. DAVIES, OF CHICAGO, ILLINOIS.

IMPROVEMENT IN CAR-DOORS.

Specification forming part of Letters Patent No. 197,343, dated November 20, 1877; Reissue No. 8,548, dated January 21, 1879; application filed November 11, 1878.

*To all whom it may concern:*

Be it known that I, WILLIAM O. DAVIES, of Chicago, in the county of Cook and State of Illinois, have invented a new and useful Improvement in Car-Doors, of which the following is a specification:

The invention relates to freight-cars, and is a door for confining grain therein.

In the accompanying drawing, the figure is a perspective view of the car-door and a part of the side of the car with the door closed, and dotted lines showing the door open.

In the drawing, A is a portion of a car; B, the door; C, an iron rod running from the sill outside of the door to the top of the car, and fastened to the same. This rod holds the back end of the door from being pressed out by the grain when loaded in the car, and also holds the door in position when open. D is the door-sill, into which the rod C enters; E, a block at the lower front corner of the door-opening, to hold the door from being pressed out. F is a slot in a piece of metal at the lower rear corner of the door, through which a pin, G, passes, forming a hinge, on which the door swings when opened. This pin G enters the door-post, and as the front end of the door is raised sustains the weight of the door, the door falling back against the clasp H.

What I claim as new, and desire to secure by Letters Patent, is—

The car-door B and rod C, which holds the back end of the same, in combination with the hinge at the lower back corner of the door and clasp H, substantially as described.

WILLIAM O. DAVIES.

Witnesses:
J. B. SMITH,
M. S. MERRIAM.